United States Patent [19]

Kington

[11] Patent Number: 5,061,154
[45] Date of Patent: Oct. 29, 1991

[54] RADIAL TURBINE ROTOR WITH IMPROVED SADDLE LIFE

[75] Inventor: Harry L. Kington, Scottsdale, Ariz.

[73] Assignee: Allied-Signal Inc., Morris Township, Morris County, N.J.

[21] Appl. No.: 448,776

[22] Filed: Dec. 11, 1989

[51] Int. Cl.$^5$ ............................................. F01D 5/14
[52] U.S. Cl. ........................... 416/186 R; 416/188; 416/229 A; 416/241 R; 29/889
[58] Field of Search .............. 416/181, 183, 185, 186, 416/188, 193 A, 204 A, 224, 213 R, 228, 229 A, 234, 241 R, 244 R, 244 A, 248; 415/200; 29/889, 889.7

[56] References Cited

U.S. PATENT DOCUMENTS

| | | | |
|---|---|---|---|
| 3,376,915 | 4/1968 | Chandley | 416/241 R |
| 3,494,709 | 2/1970 | Piearcey | 416/241 R |
| 3,572,419 | 3/1971 | Barrow et al. | 416/241 R |
| 3,598,169 | 8/1971 | Copley et al. | 164/60 |
| 4,033,792 | 7/1977 | Giamei et al. | 416/241 R |
| 4,097,276 | 6/1978 | Six | 416/244 A |
| 4,152,816 | 5/1979 | Ewing et al. | 29/156.8 R |
| 4,188,169 | 2/1980 | Mowill | 416/188 |
| 4,292,010 | 9/1981 | Meetham et al. | 416/241 R |
| 4,335,997 | 6/1982 | Ewing et al. | 416/185 |
| 4,529,452 | 7/1985 | Walker | 148/11.5 |
| 4,581,300 | 4/1986 | Hoppin et al. | 928/546 |
| 4,587,700 | 5/1986 | Curbishley et al. | 29/156.8 R |
| 4,659,288 | 4/1987 | Clark et al. | 416/186 R |
| 4,907,947 | 3/1990 | Hoppin, III | 416/241 R |

Primary Examiner—John T. Kwon
Assistant Examiner—Hoang Nguyen
Attorney, Agent, or Firm—Robert A. Walsh; James W. McFarland

[57] ABSTRACT

A radial inflow rotor for a gas turbine engine has a dual structure for improving the low cycle fatigue life of the saddle region. The interior core or hub of the rotor is a high strength polycrystalline alloy while a series of outer blade segments is individually cast as single crystals and bonded so that their low modulus (100) crystallographic axis is aligned substantially tangential to the rotor's circumference at the saddle.

11 Claims, 2 Drawing Sheets

RADIAL TURBINE ROTOR WITH IMPROVED SADDLE LIFE

TECHNICAL FIELD

This invention relates generally to gas turbine engines and more specifically to an apparatus and method to extend the life and/or improve the performance of radial inflow turbine rotors used in such engines.

BACKGROUND OF THE INVENTION

As is well known, a gas turbine engine in its basic form includes a compressor section, a combustion section and a turbine section arranged to provide a generally axially extending flow path for the working gases. Compressed air, from the compressor section, is mixed with fuel and burned in the combustor to add energy to the gases. The hot, pressurized combustion gases are expanded through the turbine section to produce useful work and/or thrust. While an aircraft propulsion engine delivers most of its useful power as forward thrust, other types of gas turbine engines, typically called auxiliary power units, furnish no thrust but are used to supply compressed air and mechanical power to drive electrical generators or hydraulic pumps. The power produced by any engine is a function of, among other parameters, the temperature of the gases admitted into the turbine section. That is, all other things being equal, an increase in power from a given engine can be obtained by increasing the working gas temperature. However, as a practical matter, the maximum gas temperature, and hence the efficiency and output of the engine, is limited by the high temperature capabilities of the various turbine section components in contact with the hot gases.

Within the turbine section are one or more stages of turbine rotor assemblies which are rotated by direct exposure to the hot gases. Such rotors are subjected to very high centrifugal forces and severe thermal gradients as well as high temperatures. There are two basic designs or types of turbine rotors, each having certain operating advantages and disadvantages. An axial-flow wheel has many relatively short, straight, airfoil shaped blades extending radially from the circumference of a generally flat disk mounted on a shaft. Typically the blades are cast individually from one material and mechanically attached to a forged disk of different material so that the properties of each component may be optimized for its particular service environment. The airfoil section of the turbine wheel is susceptible to deformation by high temperature creep and failure by creep rupture induced by the axially directed centrifugal forces imposed upon the blade, and failure by high cycle (low amplitude) fatigue induced by the pulsating impingement of the hot gases. The disks are prone to failure by low cycle fatigue cracking, which can propogate rapidly to burst the disk, caused by very high tensile forces and/or notch sensitivity due to local stress concentrations, either inherent in the disk design or resulting from undetected flaws in critical regions of the disk. Disks and blades now in use have been developed to resist these mechanisms of failure.

The other basic type of turbine rotor, a radial-inflow rotor, presents more challenging design problems when used in a severe operating environment. Radial-flow rotors are generally one piece with a series of thin, scrolled blades or fins arranged in a frusto-conical shape somewhat like a common centrifugal compressor rotor. In operation, hot combustion gases are directed tangentially towards the relatively thin blades near the peripheral rim of the rotor and flow radially inwardly between the blades over a valley-shaped region of the hub surface commonly called the "saddle" before exiting in a generally axial direction.

This hub surface (hereinafter saddle) is an area of high mechanical stress concentration due to the geometry of the rotor. In addition, it is rapidly heated by the hot gas whereas the interior of the hub responds more slowly during a cold engine start. Thus, a transient thermal gradient is created within the saddle region which causes extreme circumferential compression at or near the saddle surface. When the engine is unloaded or shutdown, the hot gas temperature rapidly drops to a lower level. This reverses the thermal gradient by rapidly cooling the saddle, thus producing circumferential tension which adds to the tensile stresses produced by centrifugal forces. Such subjection of the saddle to high temperature compression and subsequent rapid cooling contraction creates structural cracks, thought to be due to low-cycle thermal/mechanical fatigue, which propogates into the hub and can lead to eventual destruction of the entire turbine rotor.

Several different approaches to solving or reducing this cracking problem have been tried by prior researchers in this field in order to extend the useful life of such rotors.

One early attempt involved the addition of cooling air passageways within the turbine rotor adjacent the hot front face in order to reduce the maximum temperatures in the saddle. See, for example, U.S. Pat. Nos. 2,873,945 and 4,587,700. However, such internal passageways are difficult or costly to manufacture, require a complex ducting system to supply the cooling air to the rotor and generally result in high local concentrations of stress which may lead to failure.

Another approach has been to refine the geometric design of the rotor to minimize as much as possible, the peak stresses due to the variations in temperature. Even though the stress and temperature conditions within radial turbines, especially in the saddle area, are very difficult to characterize due to the complex geometry and the thermal boundary conditions, some improvements have been developed by trial-and-error testing. For example, it was discovered that the life of radial turbines could be improved significantly, with only a small loss in aerodynamic efficiency, by removing the thinnest material between the blades so that the saddle regions were more massive and thus more resistant to thermal cracking. Such scalloped rotors are now common in the art but further improvements are necessary to meet the increasing demands for longer life or higher performance from turbine engines.

One of the more recent approaches has been to construct rotors of two (or more) different materials so that each portion of the rotor will have its metallurgical properties optimized for its local operating conditions as was done for axial-flow wheels. That is, the hub is typically forged from vacuum melted ingots (or are consolidated from fine alloy powders) to have superior low temperature tensile strength and low cycle fatigue (LCF) resistance but quite limited high temperature creep rupture properties. On the other hand, the blade portion is typically cast from a relatively fine grain alloy which has the reverse properties, i.e. good creep strength but relatively poor tensile and LCF proprties.

It has even been proposed to form portions of the blade tips from directionally solidified or single crystal superalloys developed for axial-flow turbine wheels but such approaches have not been commercially successful. The problems of adequately bonding the two portions have, for the most part, been solved in the prior art by hot isostatic pressing and/or diffusion bonding. For a more complete discussion of the manufacture and benefits of dual alloy rotors see, for example, U.S. Pat. Nos. 4,335,997, 4,581,300: 4,529,452, 4,659,288, and 4,787,821 which are incorporated herein by reference.

Even though the theoretical operating life of the blade and hub portions have been increased by these prior approaches (either alone or in combination) the overall useful life of a rotor is still limited by cracking in the saddle regions to a value about an order of magnitude lower than either of the components. Further improvements in the cyclic fatigue resistance of the components are not resulting in a significant improvement in a rotors useful life. It is believed that the thermal stress range in the saddle region needs to be reduced, preferably without sacrificing aerodynamic performance.

In view of the foregoing needs of the art, it is an object of the present invention to provide a novel radial flow turbine rotor having improved LCF life in the saddle regions by reducing the effects of cyclic thermal stresses therein.

Another object of the invention is to provide a method of manufacturing a radial flow rotor having an increased resistance to saddle cracking without a sacrifice in aerodynamic performance.

Further objects and features of the invention should become apparent from the following specification and claims.

SUMMARY OF THE INVENTION

The present invention aims to overcome some of the disadvantages of the prior art as well as offer certain other advantages by providing a radial flow turbine rotor having a series of superalloy blade segments, cast in the form of single crystals with a particular shape and crystallographic orientation, bonded to a high strength, fine grained superalloy hub material.

One particular crystallographic orientation is critical to the present invention. Each of the single crystal blade segments must have its [100] axis aligned substantially tangential to the rotor's circumference in the saddle regions. Preferably, the blade's [001] axis is secondarily oriented in the radial direction as much as possible.

While the inventor does not wish to be held to any particular theory, it is believed that the much lower elastic modulus of the single crystals [100] direction (about 50 to 60 percent of the modulus of typical high strength hub materials) allows the thermally or mechanically induced strains to be accommodated by significantly decreased stress levels (about 40 percent less) which correspondingly transfers a portion of the load to regions of higher strength and thereby increases fatigue crack initiation life by about two orders of magnitude based on an analysis of current geometric configurations of typical rotors.

Additionally, by secondarily orientating the single crystal's [001] axis as much as possible in the radial direction, the blade segment's high temperature creep resistance is improved compared to typical cast materials. Thus higher performance and longer overall life can both be achieved by the composite rotor of the present invention.

Other features and advantages of the present invention will be apparent from the following more detailed description of a presently preferred embodiment, taken in conjunction with the accompanying drawings which illustrate, by way of example and not limitation, the principles of the invention.

DETAILED DESCRIPTION OF THE PREFERRED EMBODIMENT

Figure 1:
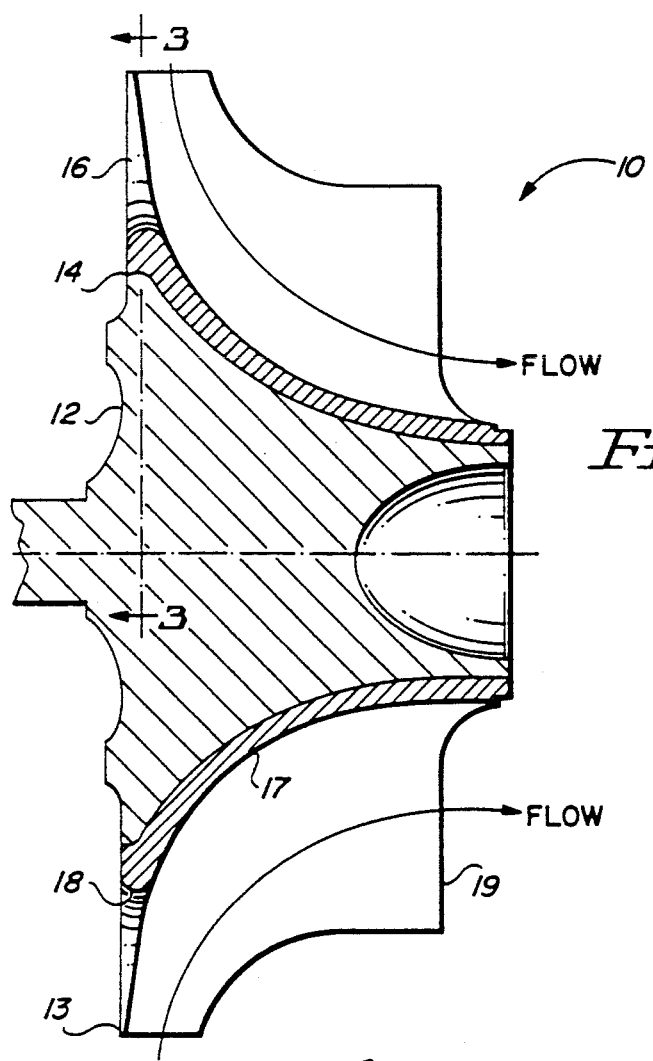
FIG. 1 is a cross-sectional side view of a composite radial inflow rotor for a gas turbine engine.

FIG. 1 illustrates a cross-sectional view through the center axis of a radial inflow turbine rotor 10 made by the process of the present invention. The generally conical rotor 10 includes a series of thin, curved airfoils or blades 16 each having an inducer tip 13, extending radially from the largest diameter portion of the rotor 10, and an exducer or trailing edge 19 extending from the smaller diameter portion. In use, hot gases are directed tangentially into the inducer 13 flow, down the continually narrowing gas path formed by surfaces 17 between the blades 16 and leave the rotor in a generally axial direction past the trailing edges 19 of the blades 16. Torque to spin the rotor is supplied by the gas pressing against one side of the blades 16 as it accelerates through the turbine.

While the rotor 10 is a unitary structure, it is fabricated from several individual components bonded together. The central core or hub 12 is made from a high strength, fine grained, polycrystalline superalloy forging or a consolidated powder compact. Several suitable alloy compositions are known in the art and sold under the trademarks or tradenames of Astroloy, IN-100, Rene' 95, U-720, Waspaloy and others. The preferred material is low carbon Astroloy. They all have a modulus of about $32 \times 10^6$ at room temperature and a modulus of about 27 or $28 \times 10^6$ at typical (about 1050° F.) operating temperatures.

Figure 2:
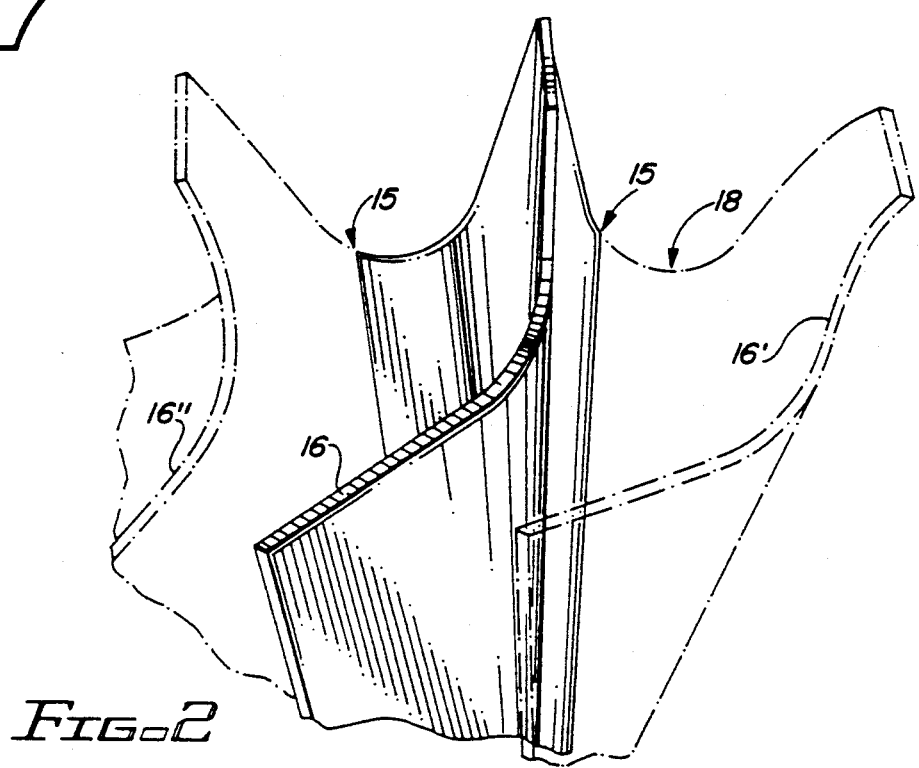
FIG. 2 is perspective front view of a portion of the bonded blade segments of the rotor of FIG. 1.
Figure 3:
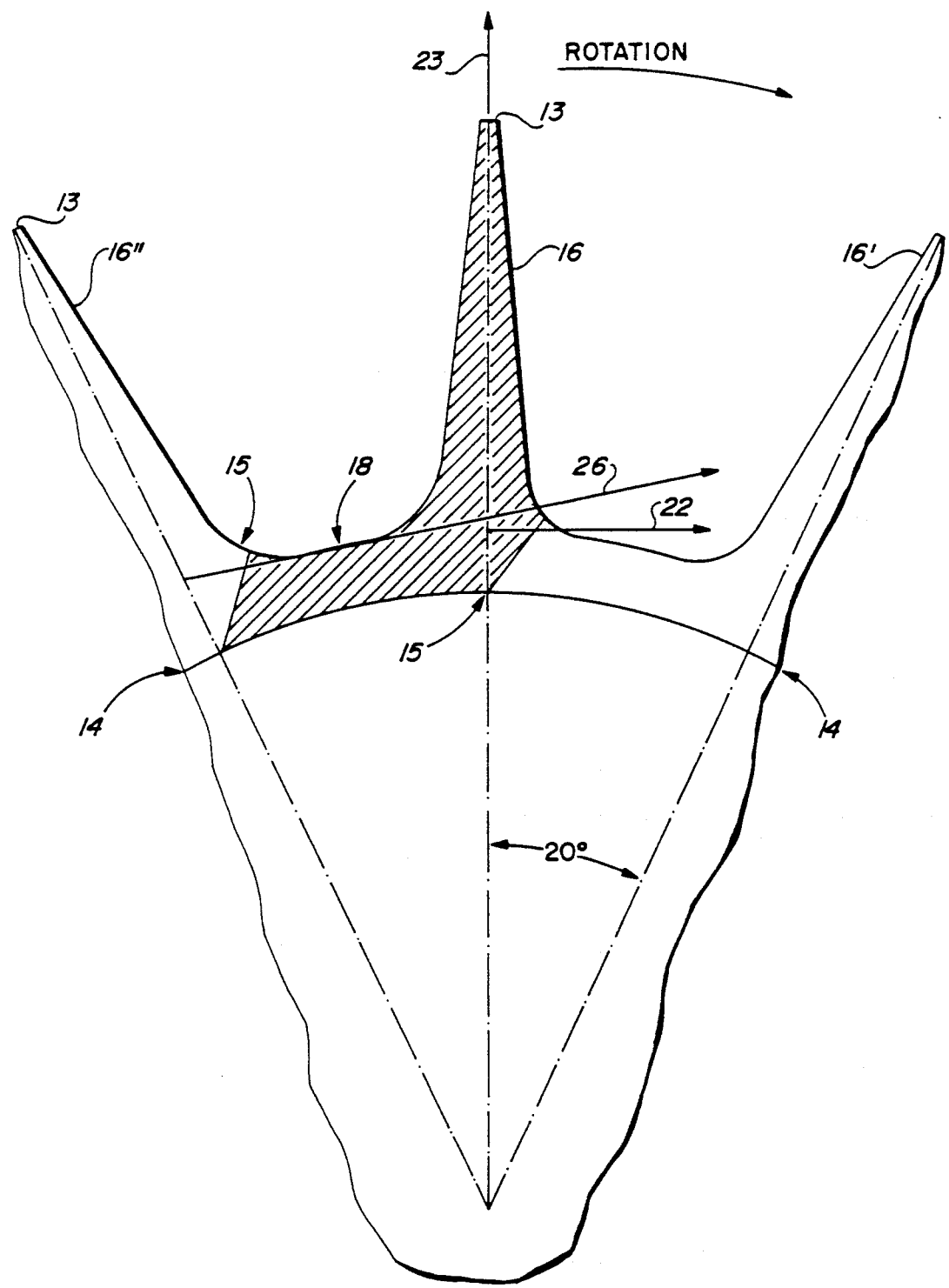
FIG. 3 is an enlarged schematic illustration of the rear portion of the rotor of FIG. 1.

Around the circumference of the hub 12 is a series (typically 14 to 20) of cast single crystal blade segments 16, 16', 16" etc. Every blade segment 16 is metallurgicaly bonded to the exterior of the cone shaped hub 12 along a circumferential bond surface 14 and each blade segment 16 is bonded to adjacent segments 16' and 16" along a radial bond surface 15, as shown in FIGS. 2 and 3. Between the radially extending blade segments is a valley or saddle 18 of lesser diameter. Since this saddle region 18 is an area experiencing very high local stress concentrations due to the complex geometry required to transition the blades into the hub and high thermal stress during operation of the turbine, the bond surfaces 14 and 15 are displaced therefrom towards areas of lesser stress. That is, the circumferential bond surface 14 lies below the surface of the saddle 18 by about at least 1 to 2 mm and preferably by about 5 mm. in a region less affected by the stress concentrating effect of the saddle geometry. The radial bond surfaces 15 are positioned less than about $\frac{1}{3}$ of the angular distance between adjacent blade segments 16; rather than midway between them. For example, in a 18 bladed rotor with blades spaced 20 degrees apart, the bond surface 15 could be placed about 3 to 7 degrees from one blade tip 16, (and thus about 13 to 17 degrees from the adjacent blade 16') rather than at the central location of the saddle. This offset bond is accomplished by casting each blade segment 16 as an asymetrical shape with the inducer tip 13 offset about 5° to 15° from the centerline of the casting and thus closer to one side bond surface than the other. Alternately, to simplify the casting process, the blade segment may be cast symetrically and one side machined away to the desired asymetrical shape.

The cyclic fatigue life in the saddle region of the blade segments 16 is controlled primarily by stress range or plastic strain range. The stress states controlling the initiation of cyclic fatigue cracks in the saddle 18 are displacement controlled. The use of a low elastic modulus material locally in the saddle will result in lower stress ranges (lower plastic strain). This approach would use single crystal blade segments with the orientation controlled to be in the tangential direction in the saddle region. Stress ranges in the saddle 18 would thereby be reduced by over forty percent. This reduction in stress range would yield a significant improvement in cyclic fatigue crack initiation life.

It will be understood that each single crystal of the superalloy material used to make the blade segments has anisotropic properties. Thus as an example, in the normal crystal structure (face centered cubic) which applies to superalloys of this sort, the value of Young's modulus is high in the [111] direction, lower in the [110] direction and at its lowest in the [100], [010], [001] directions.

Accordingly, it is important to cast each blade segment 16 so that it has one single crystalline grain structure with its [100] crystallographic axis having low modulus aligned as close as possible (at least within 8 degrees) to the direction transverse to the saddle centerline, i.e. parallel to a line tangent to the rotor's circumference at the inducer's saddle. Secondarily, it is preferred that the article's [001] crystallographic axis be approximately aligned in the radial direction. Typically, it will be misaligned less than about 10° depending on the number of blade segments used.

The single crystal material may be any acceptable superalloy that can be prepared as a single crystal. The preferred single crystal materials are those nickel base superalloys that have compositions tailored to yield optimal high temperature creep properties in the single crystal's [001] direction but have a relatively low modulus in the transverse [100] grain direction. The most preferred single crystal material is an alloy known as CMSX-3 disclosed in U.S. Pat. No. 4,582,548. In its usual commercial form CMSX-3 has a nominal composition of about 8% Co, 5% Cr, 0.5% Mo, 8% W, 6% Ta, 5.5% Al, 1.0% Ti, and the balance nickel. Its average modulus at room temperature is typically about $31 \times 10^6$ psi but the modulus in the [111] direction is higher at about $43 \times 10^6$ while in the [100] direction it is lower at about $17 \times 10^6$. Other acceptable single crystal materials are well known in the art. See, for example, U.S. Pat. Nos. 4,643,782: 4,719,080: 4,765,850 and European Patent Application No. 246,082.

Any fabrication technique which produces a substantially single crystal article is operable in conjunction with the present invention. The preferred technique, is the high thermal gradient solidification method. Molten metal of the desired composition is placed into a heat resistant ceramic mold having essentially the desired shape of the final fabricated component. The mold and metal contained therein are placed within a furnace, induction heating coil, or other heating device to melt the metal, and the mold and molten metal are gradually cooled in a controlled temperature gradient. In this process, metal adjacent the cooler end of the mold solidifies first, and the interface between the solidified and liquid metal gradually moves through the metal as cooling continues. Such gradient solidification can be accomplished by placing a chill block adjacent one end of the mold and then turning off the heat source, allowing the mold and molten metal to cool and solidify in a temperature gradient. Alternately, the mold and molten metal can be gradually withdrawn from the heat source.

It is known that certain preferred crystallographic orientations such as [001] can be grown to the exclusion of others during such a gradient solidification process, so that a single grain becomes dominant throughout the article. Techniques have been developed to promote the formation of the single crystal structure so that substantially all of the article has a desired single crystal orientation. Such techniques include seeding, described in U.S. Pat. No. 4,412,577, whereby an oriented single crystal starting material is positioned adjacent the metal first solidified, so that the cast metal continues to solidify with that orientation. Another approach is a geometrical selection process such as described in U.S. Pat. No. 3,494,709 but is not preferred since it is very difficult to select the desired secondary crystallographic orientations of the final article.

As used herein, a single crystal article is one in which substantially all of the article has a single crystallographic orientation through the load bearing portions, without the presence of high angle grain boundaries. A small amount of low angle grain boundaries, such as tilt or twist boundaries, are permitted within such a single crystal article, but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such deviations from a perfect single crystal, which are found in normal commercial production operations are within the scope of the term "single crystal" as used herein.

After the single crystal blade segments 16 are cast and/or machined to the desired shape, they are bonded together and to the periphery of the hub by, preferably, hot isostatic pressing (HIP) as is well known in the art.

It may be convenient to first bond the individual blade segments together to form a ring of blades so that the circumferential bond surfaces 14 can be machined to accurately mate with the periphery of the hub 12. Alternately, the blade segments may be accurately positioned relative to one another about the periphery of the hub and all bonds performed at the same time.

As should now be appreciated, the composite rotor of the present invention provides a low modulus (at least 20% lower than that of the hub), soft material in the transverse saddle regions, as a means for reducing the thermal and mechanical stresses therein at any given strain imposed by the operating forces, while maintaining as much as possible the higher creep strength in the radial inducer tips and a high strength hub resistant to bursting. Thus, this improved rotor will have much longer life under the same operating conditions as prior rotors or may be operated under more severe conditions of temperature and/or speed without the reduction in life associated with prior rotors.

While in order to comply with the statute, this invention has been described in terms more or less specific to one preferred embodiment, it is expected that various alterations, modifications, or permutations thereof will be apparent to those skilled in the art. Therefore, it should be understood that the invention is not to be limited to the specific features shown or described but it is intended that all equivalents be embraced within the spirit and scope of the invention as defined by the appended claims.

What is claimed is:

1. A radial inflow turbine rotor of the type having a generally conical shaped hub with radially extending blades separated by valley-shaped saddle regions adapted to be contacted by hot gas flow in a gas turbine engine comprising a plurality of single crystal blade segments bonded around the circumference of a high strength hub material; wherein each of said single crystal blade segments extends into and below the surface of said saddle region and has its <1.0.0> crystallographic axis aligned substantially in a tangential direction of the rotor to provide improved cyclic fatigue life in said saddle regions.

2. The rotor of claim 1 wherein said <1.0.0> crystallographic axis being aligned within at least 8 degrees of said tangential direction of the saddle region.

3. The rotor of claim 1 wherein each of said single crystal blade segments is bonded to adjacent segments along bonding surfaces which do not pass through the central location of said saddle regions.

4. The rotor of claim 3 wherein said bonding surfaces are positioned about one-forth to one-third of the angular distance between said blade segment and its adjacent blade segment.

5. The rotor of claim 1 wherein each of said single crystal blade segments have their <0.0.1> crystallographic axis aligned within about 20 degrees of the blades radially extending axis.

6. The rotor of claim 1 wherein said single crystal blade segments are nickel base superalloy castings and said high strength hub material is a fine grained, polycrystalline, nickel base superalloy.

7. The rotor of claim 6 wherein single crystal superalloy has a modulus in the <1.0.0> crystallographic direction of less than about $16 \times 10^6$ psi. at 1000° F.

8. The rotor of claim 7 wherein the modulus of the hub material is at least twenty percent greater than the single crystal.

9. The rotor of claim 7 wherein said single crystal superalloy is CMSX-3 alloy and said hub material is selected from the group consisting of Astroloy, IN-100, U-720, and Waspaloy.

10. A blade segment adapted to be bonded into a radial inflow turbine rotor comprising a body of single crystal superalloy material having; at one end thereof, a curved saddle region in which the superalloy's <1.0.0> crystallographic axis is aligned transversely to the centerline of said curve and extending below the surface of said saddle region 11. A method for fabricating a radial inflow turbine rotor of the type having integral blades separated by saddle regions extending radially from a generally conical hub, comprising the steps of:

casting individual blade segments, including one blade and a portion of its adjoining saddle, from a nickel base superalloy into the form of a single crystal with its <1.0.0> crystallographic axis aligned transversely and below the surface of to said saddle portion, providing a generally conical shaped hub of high strength superalloy material, positioning said blade segments accurately relative to one another about the periphery of said hub, and bonding said blade segments together and to said hub to form a unitary rotor.

* * * * *